United States Patent [19]
Berg

[11] Patent Number: 4,708,432
[45] Date of Patent: Nov. 24, 1987

[54] FIBER OPTIC CONNECTOR INCLUDING AUTOMATIC WIPING MECHANISM

[75] Inventor: Arne Berg, Kattem, Norway

[73] Assignee: Stiftelsen for Industriell og Teknisk Forskning ved Norges Tekniske Høgskle (SINTEF), Trondheim, Norway

[21] Appl. No.: 718,775

[22] PCT Filed: Aug. 9, 1984

[86] PCT No.: PCT/NO84/00030

§ 371 Date: Apr. 2, 1985

§ 102(e) Date: Apr. 2, 1985

[87] PCT Pub. No.: WO85/00899

PCT Pub. Date: Feb. 28, 1985

[30] Foreign Application Priority Data

Aug. 11, 1983 [NO] Norway ................................ 832882

[51] Int. Cl.$^4$ .................................................. G02B 6/38
[52] U.S. Cl. ................................. 350/96.21; 350/96.22
[58] Field of Search ............... 350/96.20, 96.21, 96.22, 350/96.15

[56] References Cited

U.S. PATENT DOCUMENTS

4,477,146 10/1984 Bowen et al. ............... 350/96.20 X
4,530,567 7/1985 Simon .............................. 350/96.20

*Primary Examiner*—Eugene R. LaRoche
*Assistant Examiner*—James C. Lee
*Attorney, Agent, or Firm*—Wenderoth, Lind & Ponack

[57] ABSTRACT

A fiber optic connector includes two connector parts provided with respective covers, which in the disconnected condition of the connector, protects interfaces in the light path and which, during mating of the connector parts for mutual coupling therebetween, is adapted to be displaced in order that the interfaces be exposed and that a continuous light path is established through the connector. Each cover has a wiper element adapted to clean the corresponding interface when the cover is displaced. Preferably each connector part has a separate fiber holder which suitably is suspended in a movable manner. The location of the light path in the side-wall of the connector provides particularly good protection and cleaning.

12 Claims, 17 Drawing Figures

FIBER OPTIC CONNECTOR INCLUDING AUTOMATIC WIPING MECHANISM

BACKGROUND OF THE INVENTION

This invention relates to a fiber optic connector which in particular is intended for applications where the probability of contamination is high, for example in military equipment or in offshore and underwater installations and certain industries. A simple connecting operation and good protection when disconnected is important in such applications.

The practical use of fiber optic systems requires detachable contacts for termination at a transmitter and a receiver. In some applications there are also employed fiber optic connectors for joining already terminated cable lengths. A long transmission distance and a safe signal transmission require a minimum of transmission losses in the connectors.

The losses in fiber optic connectors are, inter alia, determined by the positioning accuracy and possible contaminations in the connector. Connectors having lenses which collimate and focus the light require a lower longitudinal and transverse positioning accuracy, for example as described in EPC patent application of Publication No. 0057794. Such a lens system will also reduce the sensitivity of the connector with respect to foreign particles in the light path. At any rate, fiber optic connectors will often be subject to contamination and thereby increased transmission losses.

In EPC Patent Application Publication No. 0024989 there are described fiber optic connectors having movable covers which serve to protect the fiber ends and otherwise the interior of the connector parts. This known arrangement is based upon a terminating axial displacement of the optical fibers in the connector so that these are brought into mutual abutment for the finished interconnection. Thus, the arrangement does not make possible any cleaning of the optical interfaces on the fiber ends in connection with the coupling operation.

SUMMARY OF THE INVENTION

It is a purpose of this invention to provide an improved fiber optic connector which to a substantial degree reduces the problems discussed above. Thus, from the state of the art the invention takes as a starting point a fiber optic connector comprising two mating connector parts each being provided with a cover for protection in the disconnected condition of the connector, the mating movement of the connector parts for coupling therebetween causing movement of the covers so that there may be formed a continuous light path through the connector. What is novel and specific in the connector according to the invention is that the optical light path is permanently extended to an interface on each connector part, that the interfaces of the connector parts are adapted to slide against each other during the mating movement and that each cover has a wiper element adapted to clean the adjacent interface during movement of the cover.

With this solution the connector will be self-cleaning at the same time as it is protected against contamination when disconnected. Thus, when the connector is disconnected or detached, a protective cover is located in front of the transmission path where it is penetrating an interface in each connector part. When the connector is connected, the covers on both connector parts are displaced and this movement causes a wiping action on the interface of the fiber end or lens concerned, which is incorporated in the optical light or signal path in the connector. The covers are preferably spring biassed and therefore are automatically brought into the proper positions when the connector is disconnected. It is also possible, however, to provide manual retraction of the covers when the connector is disconnected. Moreover, the covers may be provided with return means which make it possible to check the fibers when the connector is disconnected.

In the structure of the invention, the light path is running in such a way in the connector that the direction of movement of each cover coincides with the direction of movement when mating the connector parts. Thus, the direction of movement is essentially transverse to and preferably normal to the light path in the region adjacent the interfaces. In a practical embodiment the light path interface lies in a side-wall of the connector part concerned, running parallel to the mating direction or substantially coincident with the longitudinal direction of the connector and thereby with the main direction of the fiber optic cables or wires on which the connector parts are mounted.

As a wiper element there is preferably used a rubber member or the like. This may be mounted in a suitable recess in the cover. Instead of rubber as the material of the wiper element, a suitable type of plastic material or another suitable material may be used.

A substantial advantage of the invention is that the protective covers are automatically displaced and removed when the connector parts are connected, at the same time providing a wiping action which will remove possible contaminations which might have reached the interfaces of the light path in the connector parts.

In connection with the solution discussed above there has also been developed fiber holders one surface of which constitutes the interface, these fiber holders preferably enabling a certain limited degree of relative movement therebetween.

BRIEF DESCRIPTION OF THE DRAWINGS

In the following the invention is explained in more detail with reference to the accompanying drawings, in which:

FIG. 8 is a somewhat simplified cross-section of an arrangement with fiber holders as shown in principle in FIGS. 7a and 7b, in a mated position, FIG. 9 is a longitudinal section of the arrangement of FIG. 8, FIGS. 10a and 10b respectively are longitudinal sectional and cross sectional views of one connector part (the female part) in the arrangement of FIGS. 8 and 9, shown disconnected and with some further details, and FIGS. 11a and 11b respectively are longitudinal sectional and cross sectional views of the other connector part (the male part) in the arrangement of FIGS. 8 and 9, shown in the disconnected position.

DETAILED DESCRIPTION OF THE INVENTION

Figure 1:
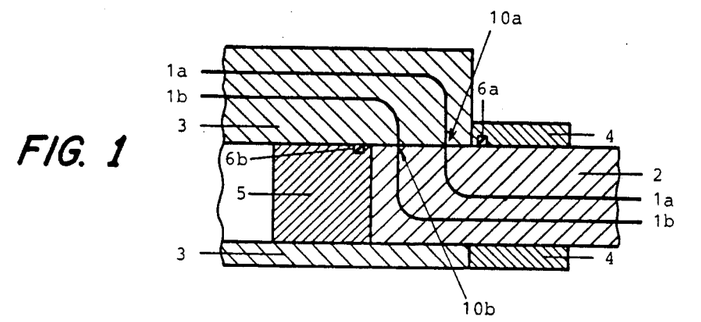
FIG. 1 is a sectional schematic view showing the principle of the arrangement according to the invention.

In FIG. 1 there are shown two connector parts 2 and 3 of which the former may be regarded as a male connector and the latter a female connector. The connector parts are shown in their connected position, the mating movement having taken place in a horizontal direction with respect to FIG. 1, for example by displacement of the male connector 2 from the right towards the left as shown therein. In both connector parts there are shown two through-going optical fibers 1a and 1b considered to be extended out of the female connector 3 towards the left into an associated cable or wire. From the male connector 2 the fibers are considered to be extended out to the right, for example to a fiber optic cable connected to the male connector.

During a coupling operation the upper surface or side-wall on the end portion of connector part 2 slides on a corresponding lower surface (side-wall) on the end portion of connector part 3 until the fiber ends are positioned directly opposite each other at points 10a and 10b. Accordingly, in this embodiment the fibers 1a and 1b are deflected substantially at a right angle from their general direction towards their respective interfaces in engagement with each other at points 10a and 10b.

As known per se connector parts 2 and 3 may be made of metal and designed with an inner cavity filled with a suitable liquid which surrounds the optical fibers 1a and 1b. It is obvious that such a connector may be intended for one, two or a higher number of optical fibers.

Further, FIG. 1 shows a protective cover 4 for the male connector part 2 and a protective cover 5 for the female connector part 3. Thus, in the position shown in FIG. 1, the cover 4 is retracted on the male connector 2 in a right-hand direction by the action of the end of the female connector 3 in order that the fiber ends may be exposed on the surface of the male connector 2. In the disconnected position the cover 4 is adapted to enclose the outer or left-hand end of the male connector 2, with respect to FIG. 1, so that the fiber ends are covered and protected. This retraction of cover 4 takes place automatically by means of a helical spring which is not shown in FIG. 1.

In a manner similar to cover 4, cover 5 also is displaceable under the action of a compressive spring which seeks to force the cover 5 to the right in the FIG. 1. However, in the mated condition shown the cover 5 is pushed back from the end portion of the female connector 3 by means of the end of the male connector 2.

An essential feature of the arrangement shown is that the covers 4 and 5 are provided with rubber profile elements 6a and 6b, respectively, which constitutes a wiper elements adapted to clean the contact surfaces when the covers are moved. The location of the rubber elements on the covers will also contribute to the formation of a tight closure over the ends of the connector parts and in particular the contact portions thereof in their disconnected condition.

The protective covers are made with dimensions and designs conforming to the respective cooperating connector parts, and during mating in order to establish contact there will be a natural movement which provides for the desired wiping and cleaning. Positioning of the interfaces or the ends of the optical fibers is obtained by having the connector parts accurately machined to fit into each other with the proper tolerances so as to obtain low losses.

Figure 2:
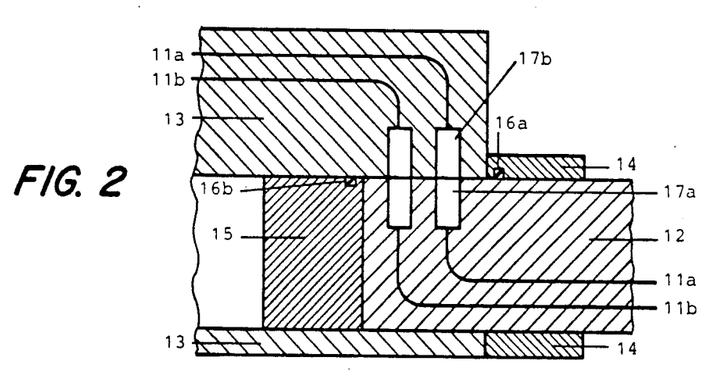
FIG. 2 is a similar view of an arrangement with lenses for collimating/focusing of a light signal.

FIG. 2 illustrates an arrangement similar to the one in FIG. 1, but having lenses inserted for collimating or focusing the light signals. Thus, for the optical fiber 11a in FIG. 2 there is mounted a lens consisting of two halves 17a and 17b each mounted to its connector part, i.e. male connector 12 and female connector 13, respectively. The surfaces to be cleaned in the light path are in this embodiment the side-wall facing downwards on lens member 17b and the side-wall facing upwards on lens member 17a. A rubber element 16a on cover 14 therefore serves to clean the interface on lens member 17a whereas a rubber element 16b on cover 15 serves to clean the interface on lens member 17b.

The lenses employed may for example be of the type having a graded index of refraction and sold by Nippon Sheet Glass Company under the designation SELFOC. However, such a connector may also be designed for other types of lenses. The advantage with a design with lenses is that the positioning requirements in the longitudinal and the transverse direction are less severe.

Figure 3A:
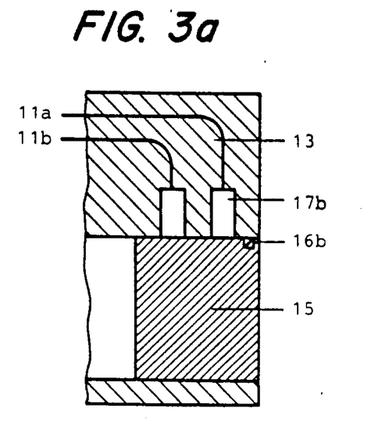
FIGS. 3a–3d are detailed views of the arrangement of FIG. 2, partly in longitudinal section and partly in cross-section, with connector parts disconnected from each other.
Figure 3B:
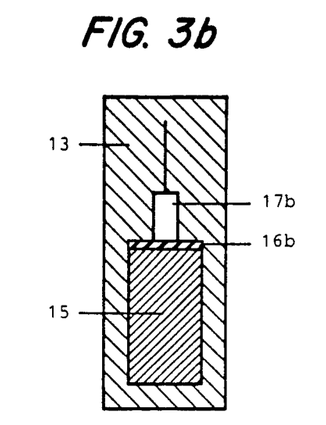
Figure 3C:
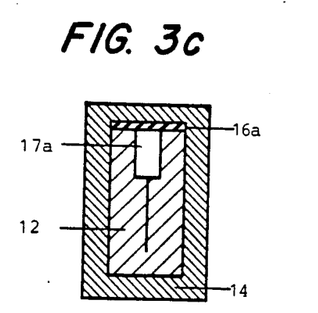
Figure 3D:
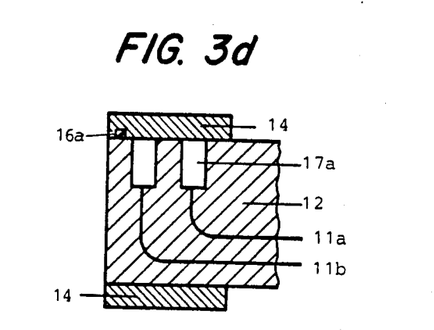

For a more detailed explanation of the embodiment of FIG. 2, FIGS. 3a, 3b, 3c and 3d show the two connector parts in the disconnected condition. Thus, FIG. 3a shows the female connector 13 with the protective cover 15 in position so as to cover the interfaces on the pair of lenses. The same also is apparent from the cross-section in FIG. 3b. In a corresponding manner FIG. 3c shows a cross-section and FIG. 3d a longitudinal section through the male connector 12 with protective cover 14 in a closed position over the lens surfaces.

Figure 4:
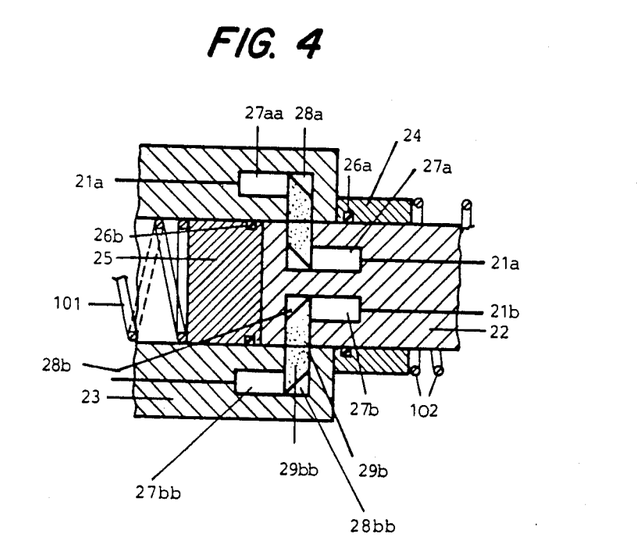
FIG. 4 is a view similar to FIG. 3, but showing an embodiment including mirrors or prisms.

FIG. 4 shows an embodiment of the arrangement based upon mirrors or prisms, inter alia for the purpose of making possible a higher number of connections or optical fibers in the connector. The arrangement of FIG. 4 may either be circular or rectangular, possibly a square arrangement in which a male connector 22 is adapted to be moved centrally into a female connector 23. A cover 24 of the male connector is provided with a rubber element 26a whereas a cover 25 of the female connector is provided with a rubber element 26b. There are shown two signal or light paths through the connector, of which the lower path comprises optical fibers 21b, a lens 27b in the male connector 22 and another lens 27bb in the female connector 23, associated prisms 28b and 28bb respectively, as well as an optically transparent material 29b and 29bb respectively, filling the space between the two prisms. Thus, in this embodiment it is the inter-engaging interfaces or side-walls of the fillings 29b and 29bb, respectively, which are subjected to the self-cleaning effect by means of the rubber element 26a and 26b, respectively, when the connector parts are disconnected and connected, respectively.

The retraction of covers 24 and 25 when disconnecting the connector in FIG. 4, takes place automatically by means of helical springs 102, 101 respectively, which exert pushing forces on the respective covers. Spring 101 which seeks to push cover 25 to the right in FIG. 4 is therefore in engagement (not shown) against a part of the female connector 23 to the left outside FIG. 4. In a corresponding manner spring 102 pushes in the opposite direction on cover 24.

As in the embodiments shown in FIGS. 1, 2 and 3, the interfaces in the embodiment of FIG. 4 may be regarded as lying in side-walls of the respective connector parts 22 and 23. These side-walls run parallel to the direction of movement of the connector parts when mated, and during disconnection thereof, respectively. In the examples shown this direction of movement is substantially the same direction as the main direction or longitudinal direction of the connector itself and the cables or wires connected thereto.

Figure 5:
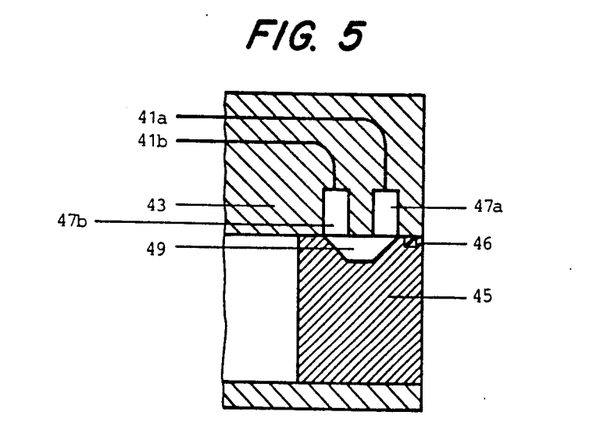
FIGS. 5 and 6 are similar views showing two modifications of the arrangement of FIG. 2, FIGS. 7a and 7b are views schematically showing a fiber holder seen from an interface and in cross-section, respectively.
Figure 6:
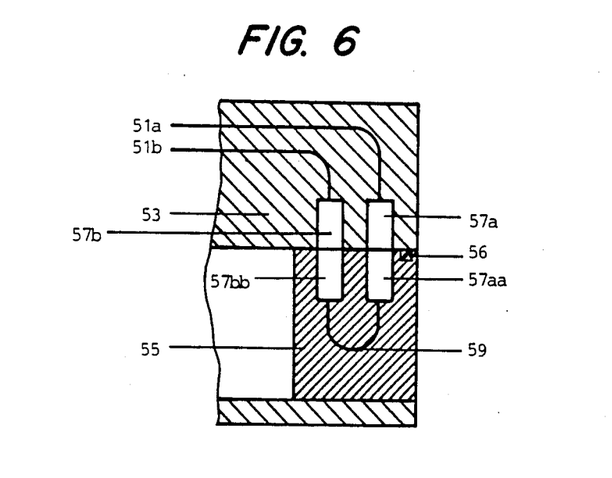

FIGS. 5 and 6 illustrate particular modifications of the arrangement of FIG. 2, with a design of the cover which makes it possible to measure the light transmission in an adjoining fiber cable when the connector is disconnected. In FIG. 5 there is shown a connector part 43 with optical fibers 41a and 41b with associated lens parts 47a and 47b, respectively. A cover 45 similar to that of the embodiment of FIG. 2 has a rubber element 46 for wiping the interfaces of lenses 47a and 47b. Besides, on cover 45 there is mounted a prism 49 which with its reflecting surfaces provides for coupling of the optical fiber 41a directly back to the optical fiber 41b so that the optical signal is sent back through the cable connected to connector part 43.

In the embodiment of FIG. 6 there is shown a connector part 53 with optical fibers 51a and 51b with associated lens members 57a and 57b. In this case cover 55 is provided with two lens members 57aa and 57bb adapted to cooperate with the two first mentioned lens members and being mutually interconnected through an optical fiber loop 59 so that also here there is obtained a retransmission of the optical signal from fiber 51a to fiber 51b when the cover 55 is in its protective position.

The embodiments of FIGS. 5 and 6 involve a particularly advantageous possibility for checking the cable and terminal equipment when there is employed a connector according to the present invention. Such possibility of checking or monitoring is not previously known from the literature and is particularly uncomplicated with the proposed location of the light path in the side-walls of the connector. In consequence of the above described cleaning effect obtained by means of rubber elements on the covers, for example rubber elements 46 and 56 on covers 45 and 55, respectively, as shown in FIG. 5 and FIG. 6, respectively, there exist very good conditions for useful and correct measurements for checking associated fiber cables and terminal equipment in connection with the employment of fiber optic connectors according to the invention.

In the remaining FIGS. 7-11 there is shown a structure based upon the same principle as above, but with certain important details further developed. This in particular applies to a specific fiber holder on each connector part, with a surface of the fiber holder constituting the interface, and which fiber holder serves to mount the optical fiber or fibers incorporated in the arrangement, possibly a lens or lenses and a protective glass or windows.

Thus, these fiber holders are located in the side-walls of the connector parts. According to what has been described above, each of these fiber holders also is protected by a respective separate cover in the disconnected condition, whereas during mutual coupling of the connector parts they are exposed and form a continuous light path through the connector. According to the same principle as above the covers and/or the connector parts also may be provided with wiper elements which clean the fiber holders when coupling is effected.

Moreover, the fiber holders may be provided with lenses which collimate and focus the light from and to the fiber ends. Such lenses reduce the requirement as to positioning accuracy and makes it possible to employ a protective glass.

Another important feature of this embodiment has to do with the positioning of the connector parts or more specifically of the fiber holders in relation to each other. This is obtained by means of guide pins which, for example, from the fiber holder of the female connector are automatically pressed down into holes in the male connector fiber holder when the same has an approximately correct position. One or both fiber holders, for example the fiber holder in the female connector, is suspended in a flexible or movable manner, for example under spring bias, and thereby makes possible an exact positioning with respect to the cooperating fiber holder.

Disconnection may take place upon lifting the guide pins out of the corresponding holes by means of a lifting mechanism. The lifting mechanism is activated with a release arm which is incorporated in one of the connector parts, for example in the male part.

Figures 7A, 7B, 8, 9:
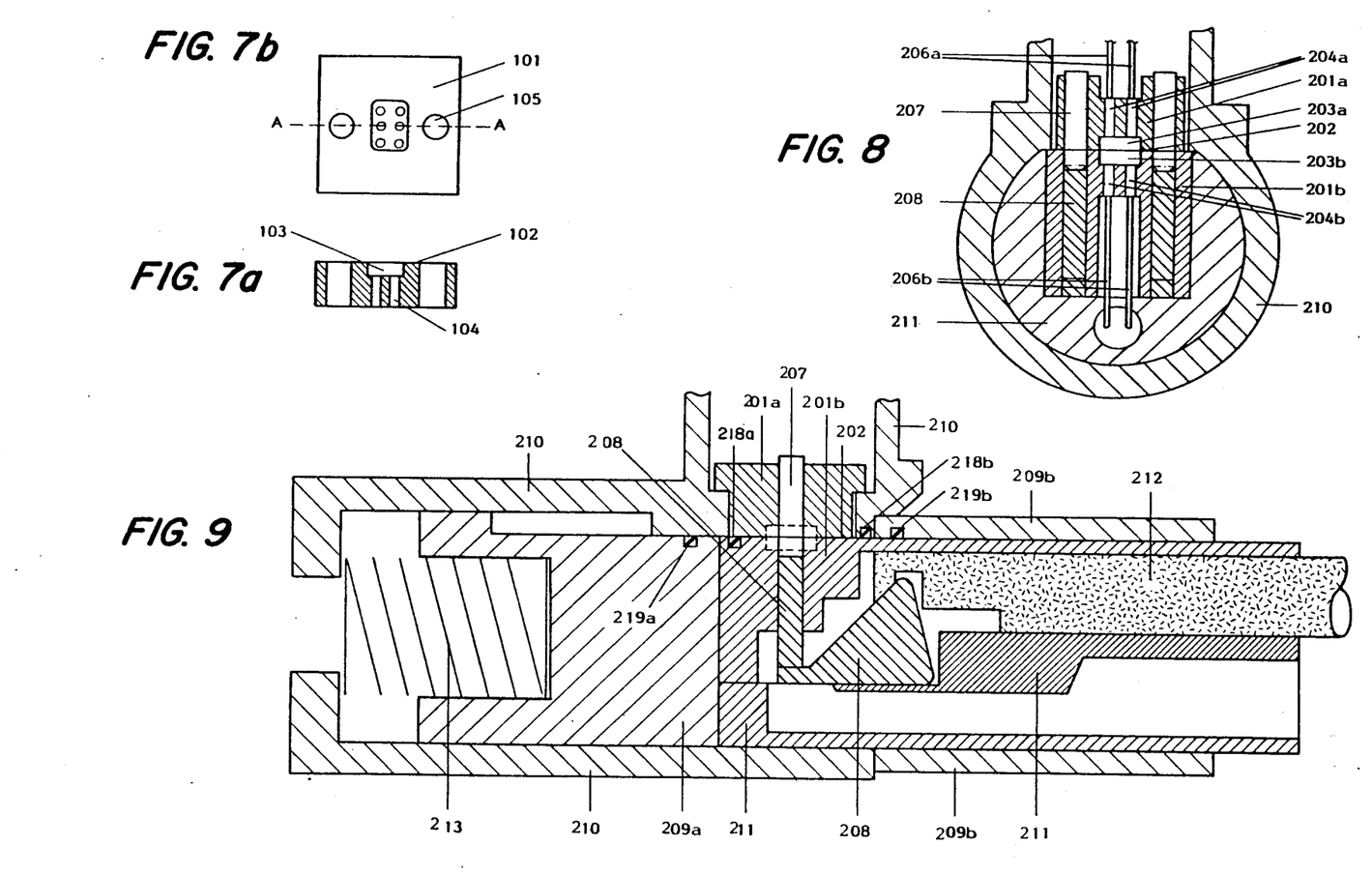

While FIGS. 7a and 7b illustrate a fiber holder separately, the remaining FIGS. 8-11 are related to the same structure seen in various stages of mating and disconnecting, in longitudinal sections and cross-sections.

In FIGS. 8 and 9 there are shown two connector parts 210 and 211 of which the former may be regarded as a female connector and the latter a male connector. The connector parts are shown as mutually coupled, the mating movement having taken place in a horizontal direction in FIG. 9, for example by having displaced the male connector 211 from the right towards the left in the figure. In FIG. 8 the same connector parts are shown in cross-section. Thus, FIG. 8 shows a continuous light path through a fiber holder 201a, fibers 206a, lenses 204a, protective glass 203a and an interface 202. Moreover, in the male connector there are in a similar way a protective glass 203b, lenses 204b and optical fibers 206b in a fiber holder 201b.

Figure 10A:
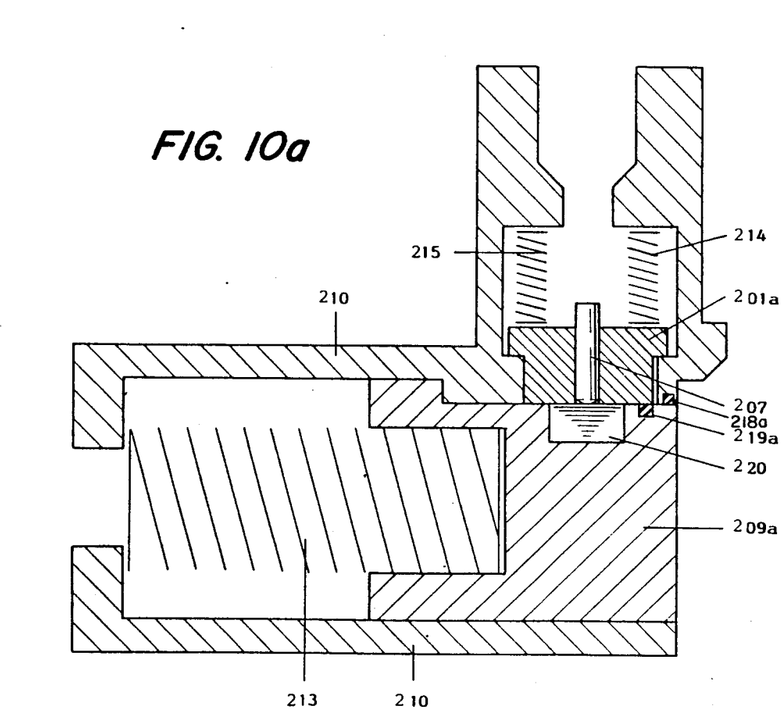
Figure 10B:
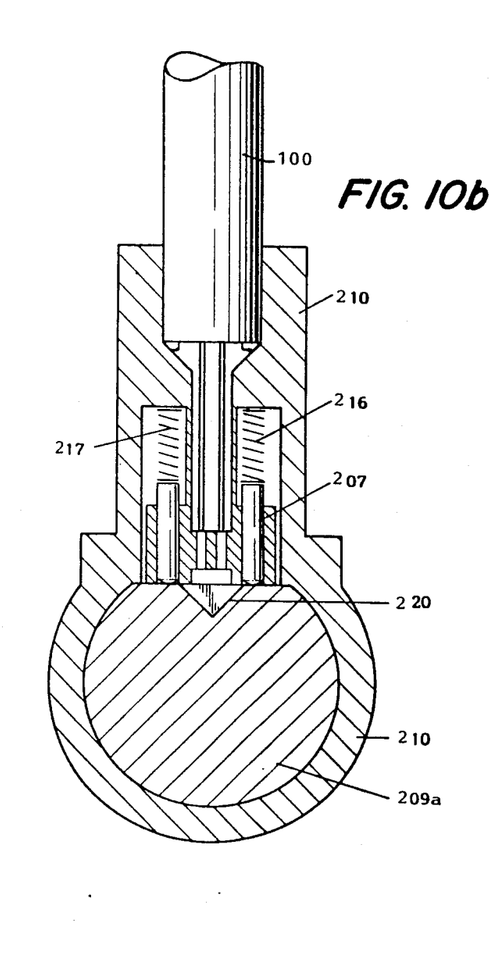
Figure 11A:
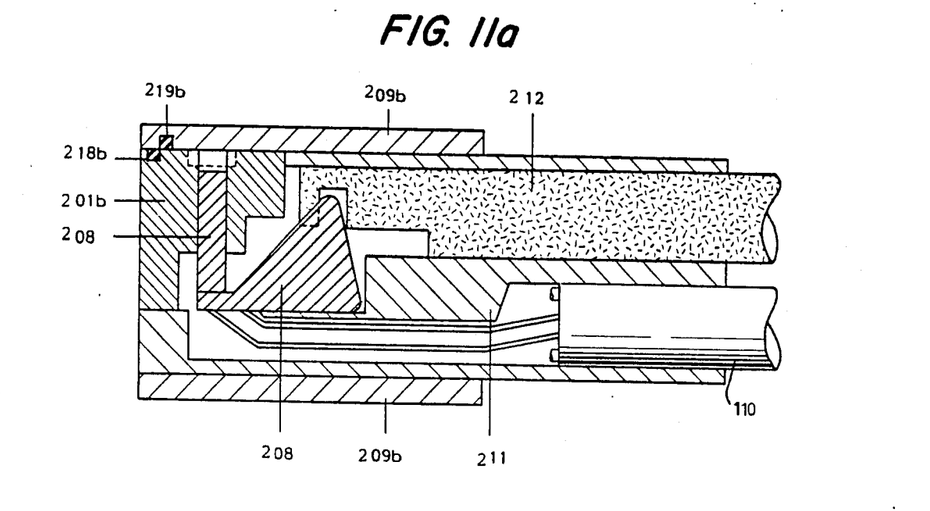
Figure 11B:
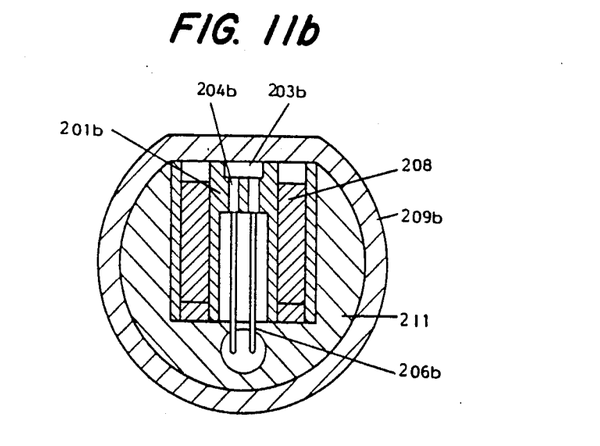

The optical fibers illustrated continue into cables 100 and 110, respectively, which may be terminated in the connector parts as shown in FIG. 10b with respect to the female connector and in FIG. 11a with respect to the male connector.

During coupling the outward surface 202 on the male fiber holder 201b slides against the corresponding surface on the female fiber holder 201a. It is obvious that these surfaces correspond to the previously mentioned interfaces or side-walls. The movement goes on until guide pins 207 are pressed into corresponding holes 105 (FIG. 7b) in the fiber holder of the male connector.

FIGS. 7a and 7b schematically show a fiber holder 101 with associated holes 105 for guide pins, holes 104 for lenses and fibers and a recess 103 for protective glass. The fiber holders may be made for the desired number of fibers by changing the number of lenses. As apparent from FIG. 7b this embodiment is intended for six fibers.

An exact positioning between the fiber holders of the two connector parts (FIGS. 8 and 9) may be obtained because the female fiber holder 201a is resiliently suspended and has a spring bias from springs 214 and 215 shown in FIG. 10a. Similarly, the guide pins 207 are forced down by separate springs 216 and 217 shown in FIG. 10b. The described resiliency or movability of one or possibly both fiber holders, which may also be obtained in other ways, reduces the requirement as to tolerances and accuracy of dimensions of the remaining portions of the connector.

When the guide pins are depressed into the male connector the connector parts are latched with respect to each other. Disconnection takes place by operating a lifting mechanism 208 which lifts the guide pins 207 out of the holes in the male fiber holder 201b and so that the connector parts may be withdrawn from each other. The lifting mechanism is elevated by means of a release arm 212.

Similar to what is explained with reference to FIGS. 1-6, the structure of FIGS. 8-11 is designed so that the protective covers 209a and 209b for the female connector and the male connector, respectively, are automatically put into position in front of their respective fiber holders 201a, 201b when the connector is disconnected. Automatic return of the covers may be obtained for example by means of springs 213. The automatic operation of the covers is possible because the fiber holders are located in the side-walls of the lateral connector and because of the simple design of the connector otherwise.

The design and coupling principle of the fiber connector also makes it possible in the embodiment of FIGS. 8-11 to provide the covers 209a, 209b and the connector parts 210, 211 with wiper elements 219a, 219b and 218a, 218b, respectively, for cleaning the interface 202 of the fiber holders including the protective glasses 203a, 203b. The wiper elements reduce the probability of losses due to contaminations. The wiper elements may be located in suitable grooves and may be made of leather, rubber or a plastic material. The movement of the connector parts when brought into engagement with each other will cause the wiper elements to be moved over the described interfaces on the male connector and the female connector, respectively.

The protective cover 209a (FIG. 10a) for the female connector may be provided with return means 220 in front of the protective window 203a in order that the light transmission in the fibers may be checked when the connector is disconnected. The return means 220 may be a prism or a material having defuse reflection. The protective cover 209b for the male connector may also have similar means in order to obtain a possibility of monitoring the light transmission in the fibers extended to the male connector, when in a disconnected condition.

The number of connections or optical fibers changes in the various embodiments shown in the drawings. It is obvious that in principle all the embodiments being shown more or less schematically, may be modified so as to make possible the coupling of one or more continuous light paths therethrough.

I claim:

1. In a fiber optic connector comprising two cooperating connector parts each being provided with a cover for protection in a disconnected condition of the connector, whereby the mating of the connector parts for mutual coupling therebetween causes movement of said covers so that there is established at least one continuous optical light path through the connector, the improvement wherein:
    said at least one optical light path includes optical fibers permanently extended to a surface on each said connector part;
    said surfaces on said connector parts slide against each other during movement to couple said connector parts thereby forming interfacing surfaces;
    said covers slide over respective said interfacing surfaces during said movement; and
    each said cover has a wiper element adapted to clean a tip of said optical fiber at the said interfacing surface of the respective said connector part when said cover is moved.

2. The improvement claimed in claim 1, wherein said wiper element is a rubber member.

3. The improvement according to claim 1, comprising at least two said continuous optical light paths, and wherein each said cover is provided with return means for, in the disconnected condition of the connector with said cover in a protective position, retransmitting an optical signal in one said light path back through another said light path.

4. The improvement according to claim 3, wherein said return means comprises a reflector, preferably in the form of a prism.

5. The improvement according to claim 3, wherein said return means comprises an optical fiber loop.

6. The improvement according to claim 1, wherein each said connector part includes a fiber holder having one surface forming the respective said interface, said fiber holder mounting the respective said optical fibers.

7. The improvement according to claim 6, wherein said fiber holder in at least one of said connector parts is suspended with a certain limited movability, under bias for an exact mutual positioning of said interfaces and said light paths in the mated condition.

8. The improvement according to claim 7, wherein such positioning is achieved by means of guide pins in one said fiber holder adapted to be automatically depressed into corresponding holes in the other said fiber holder.

9. The improvement according to claim 8, wherein said guide pins are adapted to be pressed out of said holes in said other fiber holder by means of a lifting mechanism activated by a release arm.

10. The improvement claimed in claim 6, wherein at least one said fiber holder further mounts at least one lens.

11. The improvement claimed in claim 6, wherein at least one said fiber holder further mounts a protective glass.

12. The improvement claimed in claim 6, wherein at least one said fiber holder further mounts a window.

* * * * *